(12) United States Patent
Urata et al.

(10) Patent No.: US 11,261,937 B2
(45) Date of Patent: Mar. 1, 2022

(54) WEDGE CLAMP AND STEEL WIRE

(71) Applicant: TOKYO ROPE MANUFACTURING CO., LTD., Tokyo (JP)

(72) Inventors: Yousuke Urata, Tokyo (JP); Hitoshi Hirai, Tokyo (JP)

(73) Assignee: TOKYO ROPE MANUFACTURING CO., LTD., Tokyo (JP)

( * ) Notice: Subject to any disclaimer, the term of this patent is extended or adjusted under 35 U.S.C. 154(b) by 50 days.

(21) Appl. No.: 16/617,222

(22) PCT Filed: Jun. 27, 2018

(86) PCT No.: PCT/JP2018/024318
§ 371 (c)(1),
(2) Date: Nov. 26, 2019

(87) PCT Pub. No.: WO2019/073639
PCT Pub. Date: Apr. 18, 2019

(65) Prior Publication Data
US 2021/0293303 A1 Sep. 23, 2021

(30) Foreign Application Priority Data
Oct. 12, 2017 (JP) .............................. JP2017-198255

(51) Int. Cl.
*F16G 11/04* (2006.01)
(52) U.S. Cl.
CPC .................................... *F16G 11/04* (2013.01)
(58) Field of Classification Search
CPC ............. Y10T 24/3978; Y10T 24/3996; Y10T 24/3969; F16G 11/04
See application file for complete search history.

(56) References Cited

U.S. PATENT DOCUMENTS 904,863 A  *  11/1908  Glass et al. ............. F16G 11/04
                                                    24/136 R
1,080,472 A     12/1913  Parker et al.
(Continued)

FOREIGN PATENT DOCUMENTS

CN          2057715 U     5/1990
CN        201159264 Y    12/2008
(Continued)

OTHER PUBLICATIONS

Notification of Reason for Refusal for KR Patent Application No. 10-2019-7021492; dated Jul. 27, 2020; 6 pgs.; Original KR document and English Language Translation.
(Continued)

*Primary Examiner* — Robert Sandy
(74) *Attorney, Agent, or Firm* — Dickinson Wright PLLC (57) ABSTRACT

Provided is a wedge clamp for anchoring an end of a steel wire for further enhancement in workability upon use.

A wedge clamp 1 for retaining a steel wire includes a first member 12 having a wedge shape and a second member 11 slidably fitting the first member 12 to restrain a steel wire by a pressure that generates based on the wedge shape of the first member 12, the wedge clamp 1 including an engaging portion (protrusion 124 and anchoring portion 113) enabling slidable fit between the first member 12 and the second member 11 while engaging the first member 12 and the second member 11.

12 Claims, 7 Drawing Sheets

(56) References Cited

U.S. PATENT DOCUMENTS

| | | | | |
|---|---|---|---|---|
| 1,791,283 | A | * | 2/1931 | Pleister .................. H02G 7/18 24/136 R |
| 2,068,368 | A | * | 1/1937 | Bouvier ................ H02G 7/056 403/314 |
| 2,902,736 | A | * | 9/1959 | Hampe .................. F16G 11/04 24/136 R |
| 4,542,562 | A | * | 9/1985 | Okura .................... F16G 11/04 24/115 M |
| 4,858,810 | A | * | 8/1989 | Intlekofer ............. A61B 17/22 226/127 |
| 5,137,517 | A | * | 8/1992 | Loney ................ A61M 25/013 604/159 |

FOREIGN PATENT DOCUMENTS

| | | |
|---|---|---|
| CN | 102797792 A | 11/2012 |
| CN | 202914627 U | 5/2013 |
| CN | 103703275 A | 4/2014 |
| CN | 204704315 U | 10/2015 |
| CN | 106015461 A | 10/2016 |
| GB | 371818 A | 4/1932 |
| JP | 365253 | 3/1961 |
| JP | S5115994 Y1 | 4/1976 |
| JP | S56162339 U | 12/1981 |
| JP | H0594858 A | 4/1993 |
| JP | H0626188 U | 4/1994 |
| JP | 6009611 B1 | 10/2016 |
| JP | 2016208661 A | 12/2016 |
| JP | 6077158 B1 | 2/2017 |
| JP | 6185688 B1 | 8/2017 |
| JP | 2017180840 A | 10/2017 |

OTHER PUBLICATIONS

Notice of Reasons for Refusal of JP Patent Application No. 2017-198255; dated Nov. 30, 2017; 3 pages; Original JP Document and English Language Translation.
Shaorong, Du; CN Notice of First Review Opinion; CN Patent Office; dated Jun. 15, 2020; 8 pgs.; English Language Translation, 7 pgs.
Singh, Omvir; IN Examination Report; IN Patent Office; dated Jul. 17, 2020; 5 pgs.
Extended European Search Report for EP Patent Application No. 18 86 6890; dated Aug. 4, 2021; 7 pgs.; Original EESR document.
Indonesia Patent Office Action for ID Patent Application No. P00201910396; dated Aug. 20, 2021; 5 pgs.—original document & 2 pgs. English language translation.

* cited by examiner

WEDGE CLAMP AND STEEL WIRE

CROSS REFERENCE TO RELATED APPLICATIONS

This U.S. National Stage Patent Application claims the benefit of PCT International Patent Application Serial No. PCT/JP2018/024318 filed Jun. 27, 2018 entitled "Wedge Clamp And Steel Wire" which claims the benefit of JP Patent Application No. 2017-198255 filed Oct. 12, 2017, the entire disclosures of the applications being considered part of the disclosure of this application and hereby incorporated by reference.

TECHNICAL FIELD

This invention relates to a wedge clamp for anchoring an end of a steel wire, and a steel wire anchored using the same.

BACKGROUND ART

A steel wire such as a wire rope is used for, e.g., connecting two points of a structure, for the purpose of reinforcement of the structure.

In this circumstance, it is necessary to anchor an end of the steel wire, and thus the end is subjected to an eye splice processing, etc. A typical example of the eye splice processing is a method using a wire clip. A wire clip is constructed of a U-bolt, a nut, etc., which is formed by fastening a steel wire portion folded and bundled for eye splice processing with a plurality of wire clips.

While the work is considered as rather simple, work efficiency is not as good for the need of tightening a great number of bolts and nuts. Further, the level of the work varies depending on the technique of operators, and there is a problem of difficulty in achieving a uniform operation. Moreover, the use of bolts and nuts causes complicated maintenance management such as retightening (use of locknut increases cost).

With respect to the above, the above problem in the wire clip is suppressed in the wedge clamps disclosed in Japan Patent No. 6009611 ("Patent Publication 1") and Japan Patent No. 6185688 ("Patent Publication 2").

SUMMARY OF THE INVENTION

Problems to be Solved by the Invention

In the wedge clamps disclosed in Patent Publications 1 and 2, facilitation of operation management and technique of operators as well as reduction of influence of human-caused elements, e.g., shortening of working time are attempted. As the wedge clamps disclosed in Patent Publication 1 and 2 have extremely high usefulness, use of such wedge clamps has been increasing. Along with such an increasing use, there is now a need for further enhancement in workability.

In view of the above point, this invention relates to a new wedge clamp for anchoring an end of a steel wire, and the purpose of this invention is to provide a wedge clamp where further enhancement in workability upon use, etc. is attempted.

Means for Solving the Problem

Configuration 1
A wedge clamp for retaining a steel wire, including:
a first member having a wedge shape; and
a second member slidably fitting the first member to restrain the steel wire by a pressure that generates based on the wedge shape of the first member,
in which the wedge clamp includes an engaging portion enabling slidable fit of the first member and the second member while engaging the first member and the second member.

Configuration 2
A wedge clamp for retaining a steel wire, including:
a first member having a wedge shape; and
a second member having a cylindrical body in which, by sliding and fitting the first member into the cylindrical body, a pressure that generates based on the wedge shape of the first member restrains the steel wire,
in which the wedge clamp includes an engaging portion enabling slidable fit of the first member and the second member while engaging the first member and the second member in a state where the first member is disengaged from the cylindrical body of the second member.

Configuration 3
The wedge clamp according to Configuration 1 or 2, in which the engaging portion is configured from a protrusion formed on one of the first member and the second member, and an anchoring portion for limiting movement of the protrusion formed on other of the first member and the second member.

Configuration 4
The wedge clamp according to Configuration 3, in which the protrusion is formed on the first member, and the anchoring portion and a groove for slidably receiving the protrusion are formed on the second member.

Configuration 5
The wedge clamp according to Configuration 4, in which the protrusion is formed on a distal end side of the first member, and the anchoring portion is formed on a rear end side of the groove.

Configuration 6
The wedge clamp according to Configuration 5, in which the second member includes a cylindrical body capable of inserting the steel wire and a wedge shaped portion of the first member, and the groove is formed in the cylindrical body.

Configuration 7
The wedge clamp according to Configuration 6, in which the protrusion is formed on both side surface portions of the first member, the anchoring portion is a ring-shaped member provided to protrude from a rear end of both side surfaces of the cylindrical body, in which an interval of the ring-shaped members of the both side surfaces is smaller at a rear end portion thereof than a width of protrusions on both side surfaces of the first member.

Configuration 8
The wedge clamp according to Configuration 7, in which the anchoring portion which is the ring-shaped member works as an insertion hole for an engaging pin for retaining fitting of the first member.

Configuration 9
The wedge clamp according to any one of Configurations 1 to 8, including a temporary retaining portion for temporarily retaining the steel wire.

Configuration 10

The wedge clamp according to Configuration 9, in which the temporary retaining portion has an interval that is smaller than a diameter of the steel wire so as to temporarily retain the steel wire in the interval.

Configuration 11

The wedge clamp according to Configuration 10, in which a first member side contacting surface is formed on the first member, which contacts the steel wire with two surfaces, and in which the temporary retaining portion is formed on the first member side contacting surface; or a second member side contacting surface is formed on the second member, which contacts the steel wire with two surfaces, and in which the temporary retaining portion is formed on the second member side contacting surface.

Configuration 12

The wedge clamp according to Configuration 10 or 11, in which the temporary retaining portion has an interval having a width of 95 to 98% relative to a diameter of the steel wire.

Configuration 13

A steel wire anchored using the wedge clamp according to any of Configurations 1 to 12.

Effect of the Invention

According to the wedge clamp of this invention, by providing an engaging portion for engaging a member having a wedge shape (first member) and a member for receiving the member having a wedge shape (second member), these members can be prevented from falling apart so that enhancement in workability and prevention of loss of components can be attempted.

EMBODIMENTS FOR CARRYING OUT THE INVENTION

The embodiment of this invention is described concretely below together with the drawings. Incidentally, the embodiment given below is one of the embodiments upon embodying this invention and is not intended to limit the invention within such a scope.

Figure 1A:
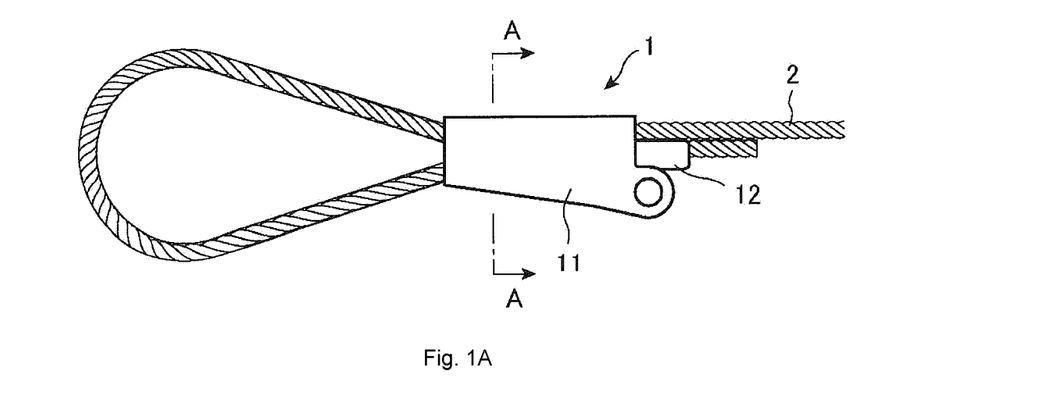
FIG. 1A shows a front view of the state of use of the wedge clamp of an embodiment of this invention.
Figure 1B:
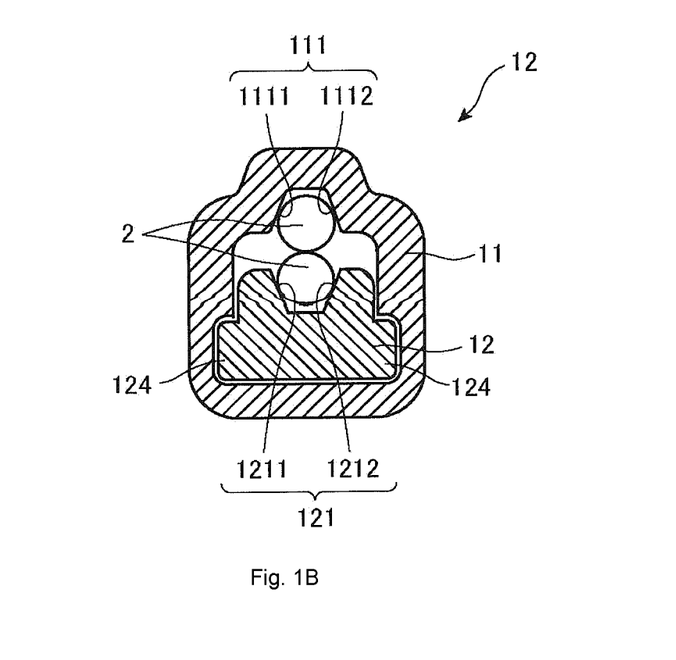
FIG. 1B is a schematic cross-sectional view along lines A-A in FIG. 1A.

FIGS. 1A and 1B show the state of use of the wedge clamp of an embodiment of this invention, in which FIG. 1A is a front view, and FIG. 1B is a schematic cross-sectional view (cross-sectional view along A-A line in FIG. 1A for explaining the fastened state of the wire rope (steel wire). Further, FIG. 4 is a perspective view showing a wedge clamp of this embodiment.

As shown in FIG. 1A, a wedge clamp 1 of this embodiment is for eye splice processing of an end portion of a cable body 2 for anchoring an end of the cable body 2 such as a wire rope.

Figure 4:
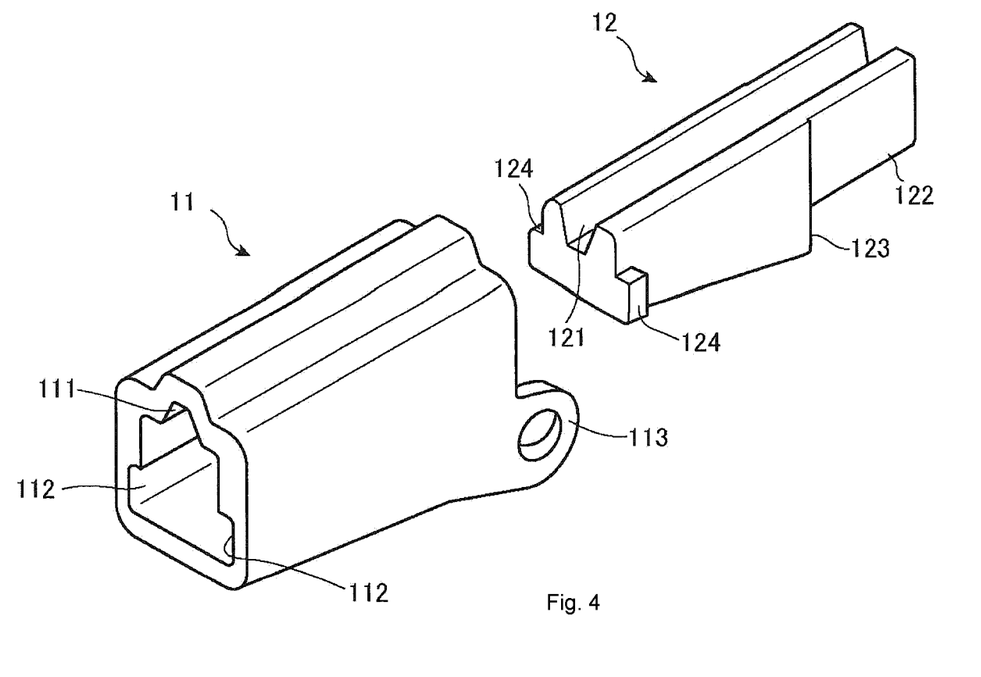
FIG. 4 is a perspective view showing a wedge clamp.

As shown in FIG. 4, the wedge clamp 1 of this embodiment includes a first member 12 having a wedge shaped portion, and a second member 11 having a cylindrical or tubular body for housing therein the first member 12 and the cable body 2.

The wedge shaped portion of the first member 12 and the cable body 2 are inserted into the cylindrical or tubular body of the second member 11, the first member 12 is driven inside (slid and fit), so that a pressure that generates based on the wedge shape of the first member restrains the cable body 2.

Figure 2A:
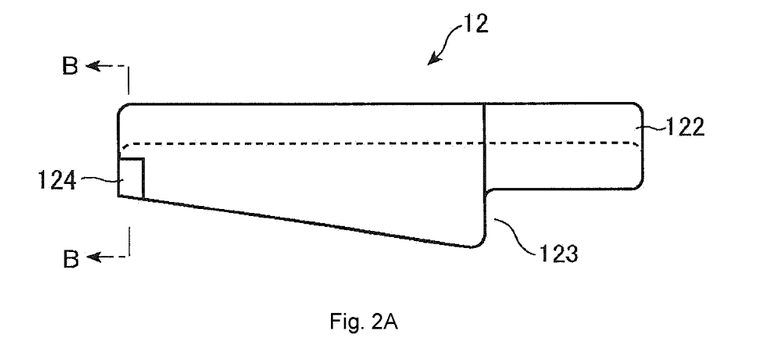
FIG. 2A shows a front view of a first member in FIG. 1A.
Figure 2B:
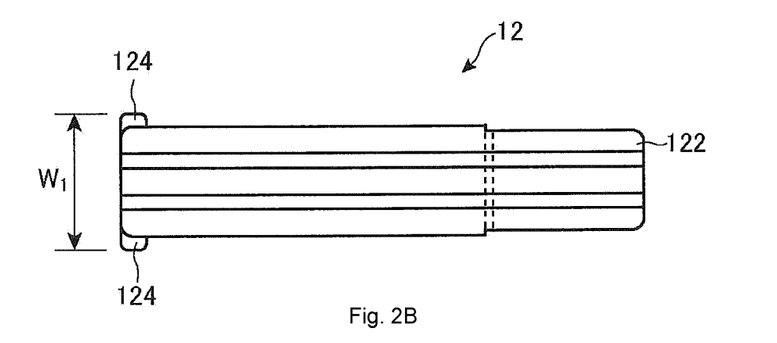
FIG. 2B shows a top view of the first member in FIG. 2A.
Figure 2C:
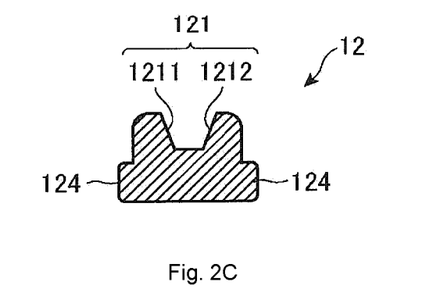
FIG. 2C shows a cross-sectional view of the first member.

FIGS. 2A-2C show the first member 12; FIG. 2A is a front view; FIG. 2B is a top view; and FIG. 2C is a cross-sectional view along line B-B in FIG. 2A.

As shown in each drawing, the first member 12 of this embodiment has a wedge shaped portion viewed from the front, and at an upper surface side thereof, has a first member side contacting surface 121 which is a V-shaped groove into which the cable body 2 fits. The first member side contacting surface 121 is configured to contact the cable body 2 with two surfaces, i.e., a surface 1211 and a surface 1212.

The first member 12 is driven toward the left in the front view in FIG. 2A, and a drive impact portion 122 is formed which further projects from a rear end portion 123 of the wedge shaped portion.

Further, both side surface portions at the distal end side of the first member 12 have a protrusion 124 formed thereon.

Figure 3A:
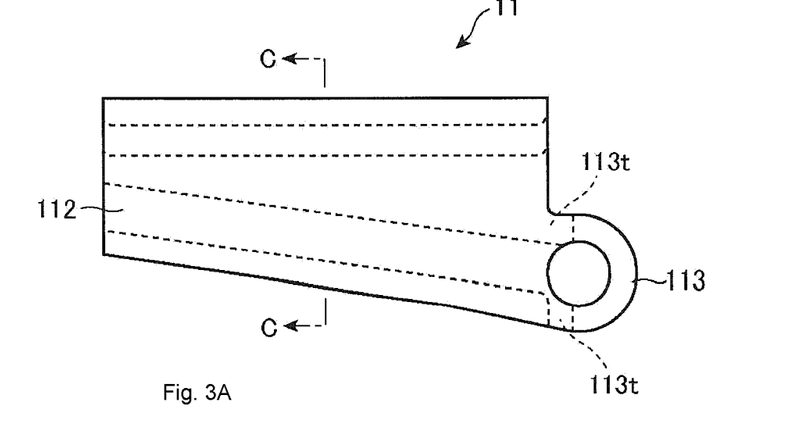
FIG. 3A shows a front view of a second member.
Figure 3B:
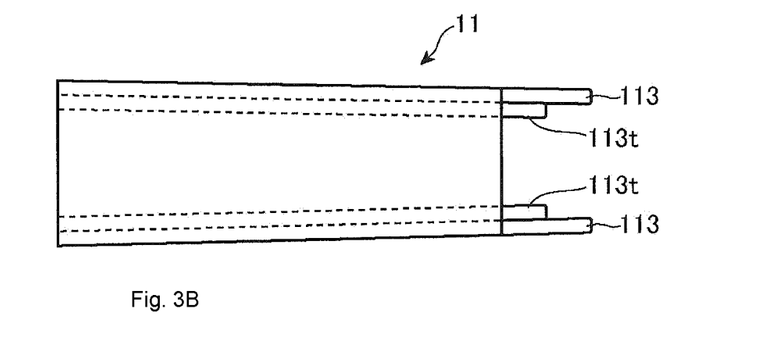
FIG. 3B is a top view of the second member.
Figure 3C:
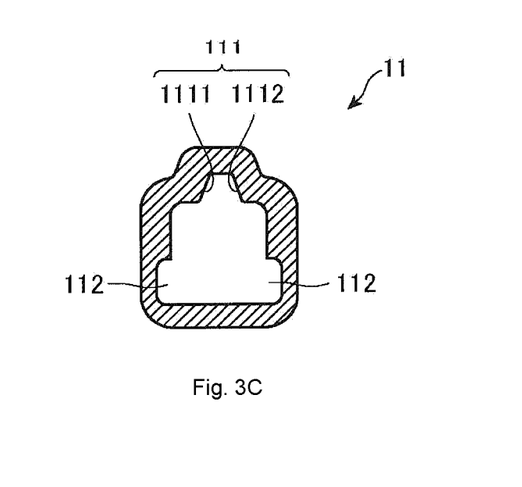
FIG. 3C is a cross-sectional view of the second member along line C-C in FIG. 3A.

FIGS. 3A-3C show the second member 11 of this embodiment; FIG. 3A is a front view; FIG. 3B is a top view; and FIG. 3C is a cross-sectional view along line C-C in FIG. 3A.

The second member 11 is for restraining the first member 12 and the cable body 2 in which, by the first member 12 and the cable body 2 entering a tapering inner space of the cylindrical or tubular body, a strong frictional force is generated between each member.

In an inner surface of the cylindrical or tubular body, there is formed a second member side contacting surface 111 which is a V-shaped groove into which the cable body 2 fits. The second member side contacting surface 111 is configured to contact the cable body 2 with two surfaces, i.e., a surface 1111 and a surface 1112.

Further, formed on both side surfaces on the inner surface of the cylindrical or tubular body is a groove 112 for slidably receiving the protrusion 124 of the first member.

Formed on a rear end side of the second member 11 (side into which the first member 12 is inserted; right hand side in FIGS. 3A and 3B), on both side surfaces thereof, is an anchoring portion 113. The anchoring portion 113 is positioned at the rear end side of the groove 112, which is a ring-shaped member provided to protrude from the rear end of both side surfaces of the cylindrical or tubular body of the second member 11 which, as will be explained below, is for receiving and engaging the protrusion 124 of the first member 12 (which limits the movement of the protrusion 124 to prevent the first member 12 from falling out). Further, the anchoring portion 113 works as an insertion hole for an engaging pin (not shown) for retaining the fitting of the first member. Namely, as can be understood from FIGS. 1 to 3, in the state of use of the wedge clamp 1 (state of FIG. 1A), inserting the engaging pin (not shown) into the hole of the anchoring portion 113 causes the rear end portion 123 of the wedge shaped portion of the first member 12 to hit against the engaging pin and will no longer retract, so that the fitted state of the first member and the second member is maintained.

By including the above configuration, in the wedge clamp 1 of this embodiment, the wedge shaped portion of the first member 12 and the cable body 2 are inserted into the cylindrical or tubular body of the second member 11, the first member 12 is driven inside (slid and fit), so that a pressure that generates based on the wedge shape of the first member restrains the cable body 2.

Detailed explanation on the restraining function itself of the steel wire based on the wedge shape is omitted herein for not being directly relevant to this invention, and the configuration regarding this invention is explained below.

Figure 5A:
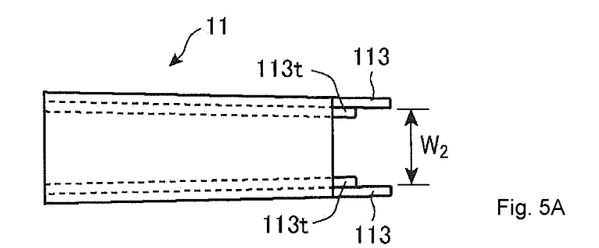
FIG. 5A is a top view of the second member as a first step in engaging the first and second members.
Figure 5B:
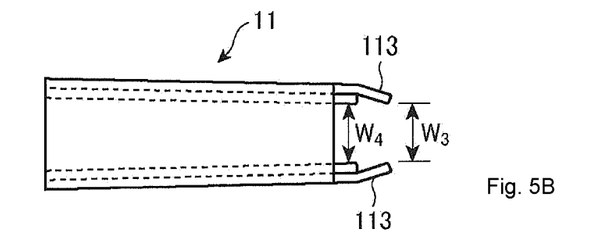
FIG. 5B is a top view of the second members of FIG. 5A showing the second step of engaging including a crimped portion on the second member near the anchoring portion.
Figure 5C:
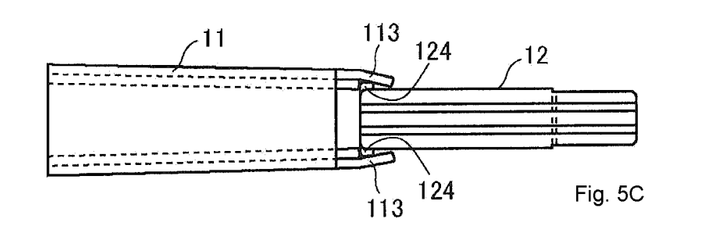
FIG. 5C is a top view of the second and first members engaging in a third step of engaging.
Figure 5D:
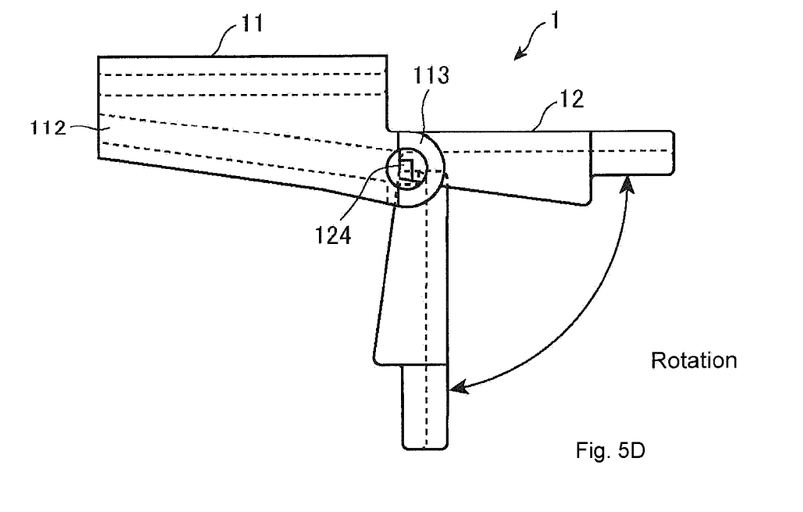
FIG. 5D is a front view of the first and second members showing rotation of the first member.

FIGS. 5A-5D are drawings for explaining the engagement of the first member and the second member; FIGS. 5A-5C are top views; and FIG. 5D is a front view.

The wedge clamp 1 is configured by the first member 12 being slidably engaged with the second member 11.

First, the first member 12 is inserted into the cylindrical or tubular body of the second member 11. At this point, the protrusion 124 of the first member 12 is inserted and slid into the groove 112 of the second member 11. As can be understood from the above, in the state of FIG. 5A, an interval $W_2$ of the anchoring portion 113 is greater than a width $W_1$ of the protrusion 124 portion (FIG. 2B).

After insertion of the first member 12 into the cylindrical or tubular body of the second member 11, a portion around the rear end of the anchoring portion 113 is crimped as shown in FIG. 5B, so that the interval $W_3$ at the rear end of the anchoring portion 113 is smaller than the width $W_1$ of the protrusion 124 portion.

As shown in FIG. 5D, the anchoring portion 113 which is a ring-shaped member has an inner diameter of the ring which is approximately similar to the height of the groove 112, with the ring at the extension line of the groove 112. Formed on upper and lower portions of the ring is a thick portion 113t (FIG. 5A) with a width W4 (FIG. 5B) less than the width $W_1$ of the protrusion 124 portion.

By the configuration explained above, when the first member 12 is slid and retracted, the protrusion 124 is introduced from the groove 112 into the ring of the anchoring portion 113 as shown in FIGS. 5C and 5D. Since the protrusion 124 will not be disengaged from the ring, the second member will not fall out from the first member. As shown in FIG. 5D, the protrusion 124 is hooked in and suspended from the ring of the anchoring portion 113, ready for rotation. Namely, in the state where the first member 12 is disengaged from the cylindrical or tubular body of the second member 11, the first member 12 is engaged with the second member 11.

Incidentally, it is impossible for the first member 12, in an advancing direction thereof, to pass through the second member 11. Therefore, after assembling the first member and the second member, the first member and the second member can be slid relative to each other but they will not fall apart.

As mentioned above, according to the wedge clamp 1 of this embodiment, since the first member 12 and the second member are capable of being slidably fit while the first member 12 and the second member 11 are engaged, loss of components can be prevented and workability upon operation is also enhanced.

In conventional wedge clamps, each member used to fall apart when the members were not assembled as a wedge clamp. However, in the wedge clamp 1 of this embodiment, the first member 12 and the second member 11 are engaged when the members are not assembled as a wedge clamp, and the first member 12 does not fall out from the second member. Therefore, falling of components during operation can be prevented and can achieve improved workability. Moreover, in the state where the first member 12 is suspended, i.e., in the state where the first member 12 is disengaged from the cylindrical or tubular body of the second member 11 as shown in FIG. 5D, an opening of the cylindrical or tubular body of the second member 11 is prevented from being blocked by the first member 12 so that workability is enhanced for an operation to insert the cable body 2 into the cylindrical or tubular body of the second member 11.

Furthermore, since the first member 12 and the second member 11 are engaged even in the state where the members are not assembled as a wedge clamp (assembling directions of the components relative to each other are fixed), an erroneous operation of inserting the first member into the second member in an opposite direction upon operation can be prevented, and reliability and efficiency of operation can be enhanced.

In addition, since the first member 12 does not fall out from the second member 11, one of the components being lost upon storage, transportation, etc. can be prevented, so that loss of components can be inhibited. In addition, since the first member 12 can easily be received in the second member upon storage, transportation, etc., space for storage, etc. can be saved.

Incidentally, in the wedge clamp 1 of this embodiment, an example was shown with a configuration where the protrusion 124 is formed on both side surfaces at the distal portion of the first member, the groove 112 is formed on both side surfaces inside of the cylindrical or tubular body of the second member, and the anchoring portion 113 which is a ring-shaped member is formed at the extension line of the groove 112, so as to form an engaging portion to engage the first member and the second member. However, this invention is not limited to the above configuration, and any configuration can be applied as long as the first member and the second member are capable of being slidably fit while the first member and the second member are engaged.

For example, the groove can be formed on the first member side, and the protrusion can be formed on the second member side.

Figure 7:
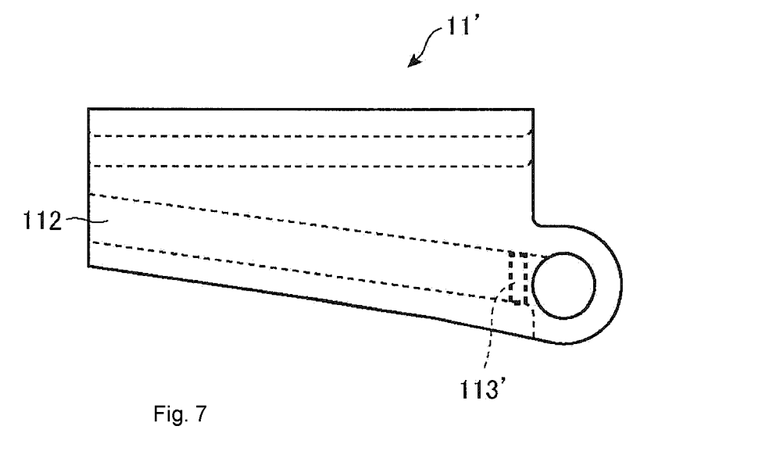
FIG. 7 shows another example of the second member.

Further, while this embodiment includes the anchoring portion as a ring-shaped member working also as an insertion hole for an engaging pin (not shown) for retaining fitting of the first member, it is sufficient for the anchoring portion to limit the movement of the protrusion (prevent falling out of the member). For example, as shown in FIG. 7, an anchoring portion 113' can be formed by providing a stopper (for filling the groove) at the rear end of the groove 112. The stopper can be formed by, e.g., a build up welding on the rear end in the groove 112 after insertion of the first member.

Figure 8A:
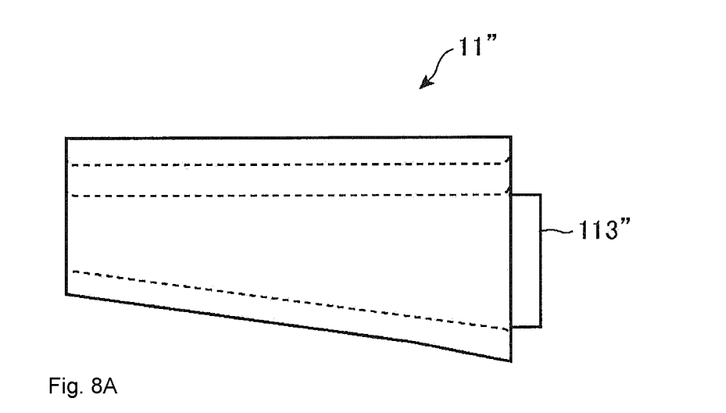
FIG. 8A is a front view of a second member.
Figure 8B:
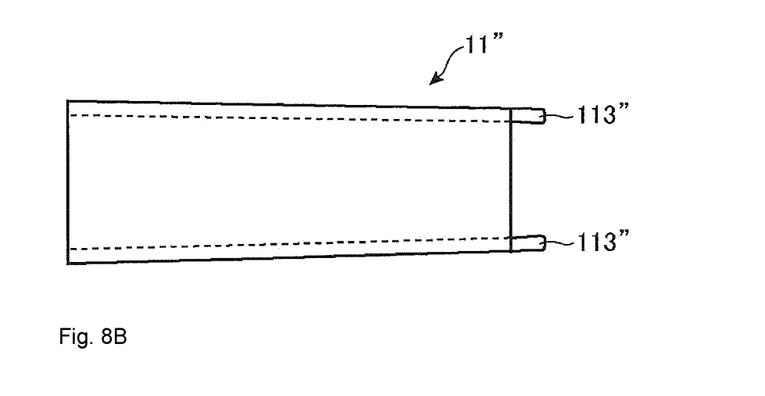
FIG. 8B is a top view of the second member in FIG. 8A.

It is also possible not to provide the groove. For example, as shown in FIGS. 8A and 8B, without forming the groove in the second member 11", the width inside of the cylindrical or tubular body is formed to allow the protrusion 124 of the first member to pass, so as to form an anchoring portion 113" to protrude from a rear end side of the side surface of the cylindrical or tubular body of the second member 11". The anchoring portion 113" is crimped after insertion of the first member, so that the protrusion 124 of the first member can be hooked (so that the first member does not fall out).

To further enhance workability upon operation, a temporary retaining portion can be provided for temporarily retaining the steel wire (cable body 2).

Figure 6A:
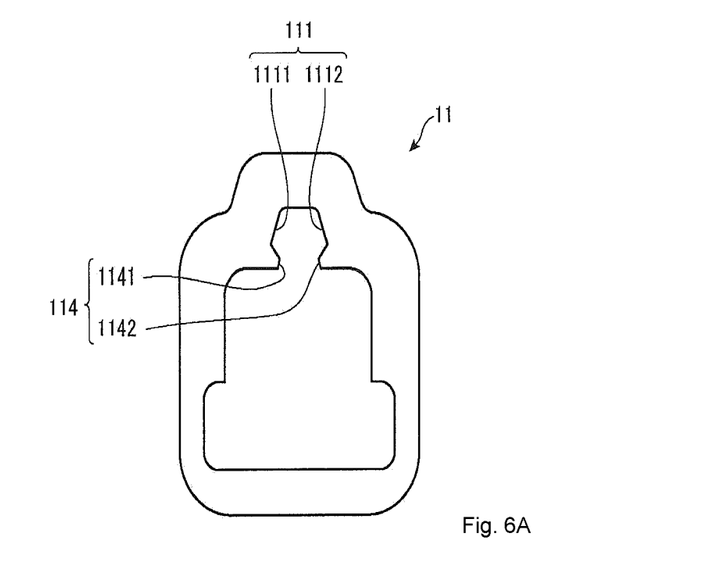
FIG. 6A is an end view of a second member including a temporary retaining portion.
Figure 6B:
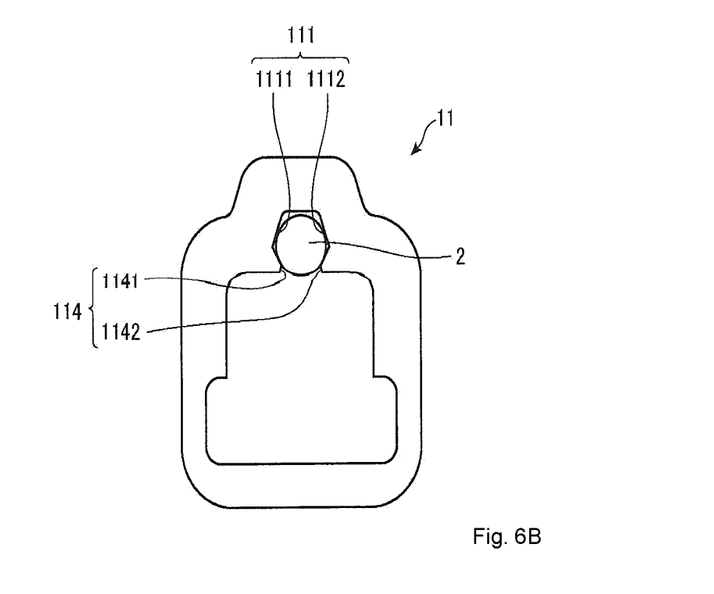
FIG. 6B is an end view of the second member in FIG. 6A illustrating a retained cable body.

FIG. 6 is one example of the temporary retaining portion.

The temporary retaining portion 114 has an interval that is smaller than a diameter of the cable body 2 so as to temporarily retain the cable body 2 in the interval.

The temporary retaining portion 114 is formed on the second member side contacting surface 111 of the second member 11. Particularly, the temporary retaining portion 114 is configured from a projection 1141 and a projection 1142 each formed on a surface 1111 and a surface 1112 of the second member side contacting surface 111, and the interval between the projection 1141 and the projection 1142 is formed to be smaller than the diameter of the cable body 2.

Thus, as shown in FIG. 6B, the cable body 2 can be held (temporarily retained) in the V-shaped groove formed by the second member side contacting surface 111.

According to the above configuration, since the wedge clamp can be temporarily retained relative to the cable body 2, workability upon operation can further be enhanced.

In the case of conventional wedge clamps, there was a problem where a component having the cable body 2 therethrough slipped and moved upon attaching operation. Such a problem can be prevented by the above configuration.

It is efficient to attach the cable body 2 to the temporary retaining portion 114 with the temporary retaining portion 114 formed in vicinity of an end of a component (opening of the cylindrical or tubular body).

Further, the interval of the temporary retaining portion 114 is preferably 95 to 98% of the diameter of the cable body 2. With such a range, a proper holding force can be obtained, and also better workability in attaching and removing.

Incidentally, while the case where the temporary retaining portion is formed on the second member is given as an example herein, the temporary retaining portion can be formed on the first member (or on both members).

While an explanation was made in the embodiment on the wedge clamp for eye splice processing of the end of the cable body as an example, this invention is not limited thereto. For example, application can be made to the wedge clamp of each embodiment given in Patent Publications 1 and 2.

Further, on the first member side contacting surface 121 of the first member 12 and the second member side contacting surface 111 of the second member 11 of the wedge clamp of this embodiment each contacting the cable body 2 with two surfaces, applying a predetermined angle to the angle between the two surfaces so as to prevent slipping with the cable body 2 is as described in Publications 1 and 2 which is extremely preferably applied; however, it is not essential in the application of this invention.

Additionally in this embodiment, while an example is given where the first member is formed generally only from a wedge shape and the second member is formed generally only from a cylindrical or tubular body, this invention is not limited thereto. It is sufficient for the invention to include the first member having the wedge shaped portion and the second member fitting the first member to restrain the cable body by a pressure that generates based on the wedge shape of the first member. For example, the invention can be applied to a holding device (wedge clamp) disclosed in Japan Patent No. 6077158. While the holding device disclosed in Japan Patent No. 6077158 is constructed from a pair of symmetrical components, the basic concept as a wedge clamp is identical on the point of having a wedge shaped portion on one member and the other member having a function to restrain a cable body by a pressure that generates based on the wedge shape. Therefore, this invention can be applied to a pair of components that slide and fit relative to each other, so that the components are engaged in order to prevent them from falling apart. Similarly, it is possible to apply a temporary retaining portion for temporarily retaining the cable body.

The invention claimed is:

1. A wedge clamp for retaining a steel wire, comprising:
   a first member having a wedge shape; and
   a second member having a tubular body in which, by sliding and fitting the first member into the tubular body, a pressure that generates based on the wedge shape of the first member restrains the steel wire,
   wherein the wedge clamp comprises an engaging portion enabling slidable fit of the first member and the second member while engaging the first member and the second member in a state where the first member is disengaged from the tubular body of the second member.

2. The wedge clamp according to claim 1, wherein the engaging portion is configured from a protrusion formed on one of the first member and the second member, and an anchoring portion for limiting movement of the protrusion formed on another of the first member and the second member.

3. The wedge clamp according to claim 2, wherein:
   the protrusion is formed on the first member, and
   the anchoring portion and a groove for slidably receiving the protrusion are formed on the second member.

4. The wedge clamp according to claim 3, wherein:
   the protrusion is formed on a distal end side of the first member, and
   the anchoring portion is formed on a rear end side of the groove.

5. The wedge clamp according to claim 4, wherein:
   the second member comprises a tubular body capable of inserting the steel wire and a wedge shaped portion of the first member, and
   the groove is formed in the tubular body.

6. The wedge clamp according to claim 5, wherein:
   the protrusion is formed on both side surface portions of the first member,
   the anchoring portion is a ring-shaped member provided to protrude from a rear end of both side surfaces of the tubular body, wherein an interval of the ring-shaped members of the both side surfaces is smaller at a rear end portion thereof than a width of protrusions on both side surfaces of the first member.

7. The wedge clamp according to claim 6, wherein the anchoring portion which is the ring-shaped member works as an insertion hole for an engaging pin for retaining fitting of the first member.

8. The wedge clamp according to claim 1, comprising a temporary retaining portion for temporarily retaining the steel wire.

9. The wedge clamp according to claim 8, wherein the temporary retaining portion has an interval that is smaller than a diameter of the steel wire so as to temporarily retain the steel wire in the interval.

10. The wedge clamp according to claim 9, wherein:
a first member side contacting surface is formed on the first member, which contacts the steel wire with two surfaces, and wherein the temporary retaining portion is formed on the first member side contacting surface; or
a second member side contacting surface is formed on the second member, which contacts the steel wire with two surfaces, and wherein the temporary retaining portion is formed on the second member side contacting surface.

11. The wedge clamp according to claim 9, wherein the temporary retaining portion has an interval having a width of 95 to 98% relative to a diameter of the steel wire.

12. A steel wire anchored using the wedge clamp according to claim 1.

* * * * *